(12) United States Patent
Wu

(10) Patent No.: US 11,174,186 B2
(45) Date of Patent: Nov. 16, 2021

(54) HIGHLY EFFICIENT PIPE-TYPE FLOCCULATION MIXER, AND FEEDING-MIXING DEVICE

(71) Applicant: Yunping Wu, Fuzhou (CN)

(72) Inventor: Yunping Wu, Fuzhou (CN)

(*) Notice: Subject to any disclaimer, the term of this patent is extended or adjusted under 35 U.S.C. 154(b) by 370 days.

(21) Appl. No.: 16/311,661

(22) PCT Filed: Aug. 23, 2016

(86) PCT No.: PCT/CN2016/096340
§ 371 (c)(1),
(2) Date: Dec. 19, 2018

(87) PCT Pub. No.: WO2018/035705
PCT Pub. Date: Mar. 1, 2018

(65) Prior Publication Data
US 2019/0209982 A1 Jul. 11, 2019

(51) Int. Cl.
*B22C 5/00* (2006.01)
*C02F 11/14* (2019.01)
(Continued)

(52) U.S. Cl.
CPC ............ *C02F 11/14* (2013.01); *B01F 3/0853* (2013.01); *B01F 7/007* (2013.01); *B01F 7/18* (2013.01);
(Continued)

(58) Field of Classification Search
CPC combination set(s) only.
See application file for complete search history.

(56) References Cited

U.S. PATENT DOCUMENTS 3,075,747 A * 1/1963 Calvert .................. B01F 7/302
366/288

FOREIGN PATENT DOCUMENTS

CH 382130 A * 9/1964 ............... C08B 5/02
CN 204973704 U * 1/2016
(Continued)

OTHER PUBLICATIONS

Machine Translation of JP-2002045670-A description, Feb. 2002 (Year: 2002).*
(Continued)

*Primary Examiner* — Anshu Bhatia
*Assistant Examiner* — Gregory Y Huan
(74) *Attorney, Agent, or Firm* — Li & Cai Intellectual Property Office

(57) ABSTRACT

Provided is a highly efficient pipe-type flocculation mixer, comprising: a feeding pipe, a mixing pipe, a discharging pipe and a mixer. The feeding pipe, the mixing pipe and the discharging pipe are disposed in parallel and sequentially communicated. The mixing pipe is a circular pipe and has two blind ends. The mixer comprises a driving motor, a mixing blade and a central shaft. One end of the central shaft is coupled to the driving motor, and another end of the central shaft is coupled to the mixing blade. The size of the mixing blade enables the mixing pipe to exactly accommodate the mixing blade. Also provided is a feeding-mixing device, wherein an agent can be introduced into a hollow central shaft via an agent feeding chamber, and be sprayed out from the central shaft into a mixing chamber; said agent feeding manner enables sufficient mixing.

6 Claims, 3 Drawing Sheets

(51) Int. Cl.
  B01F 7/18  (2006.01)
  B01F 3/08  (2006.01)
  B01F 7/00  (2006.01)
  B01F 7/20  (2006.01)

(52) U.S. Cl.
  CPC ........ B01F 7/20 (2013.01); *B01F 2215/0052* (2013.01)

(56) References Cited

FOREIGN PATENT DOCUMENTS

| | | | |
|---|---|---|---|
| JP | 2002045670 A | * 2/2002 | |
| KR | 20100130363 A | * 12/2010 | .............. B01F 7/007 |

OTHER PUBLICATIONS

"Lee Plunkett Warren, 'Procede et appareil pour la fabrication continue de nitrocellulose', Sep. 1964 Document labeled as CH382130A_desc_mt" (Year: 1964).*

"Xue Huizhong, 'Mud developments quenching and tempering mixing arrangement', Jan. 2016 Document labeled as CN204973704U_desc_mt" (Year: 2016).*

A google machine translation of KR-20100130363-A is attached (Year: 2010).*

* cited by examiner

HIGHLY EFFICIENT PIPE-TYPE FLOCCULATION MIXER, AND FEEDING-MIXING DEVICE

BACKGROUND OF THE INVENTION

1. Field of the Invention

The present invention relates to a solid-liquid separator; in particular, to a pipeline at a front end of the solid-liquid separator.

2. Description of Related Art

At the front end of a solid-liquid separator, in order to ensure sufficient separation of sludge and water, a flocculation mixing tank is mounted on the front end of a dewatering machine or different kinds of pipeline mixers are used.

In the flocculation mixing tank, after meeting at the tank bottom, sludge and flocculants are blended by mixing with a mixer, and gradually clump to form flocs. However, such a flocculation mixing tank has the following shortcomings:

1. During mixing with the mixer, the intrinsic structure of the tank body of the flocculation mixing tank inevitably leads to insufficient or non-uniform mixing in blind spots, resulting in an undesired and unstable flocculation effect.

2. The mixing speed of the mixer is not fast enough to realize thoroughly uniform mixing of the sludge and agents. The gathered energy is not strong enough to realize the most efficient utilization of all the agents. Thus, the agent consumption is increased, and the flocculation effect is dissatisfactory.

3. A little bit large and long, the mixing blade easily deforms and fractures, causing unstable operation.

A pipeline mixer enables sludge and flocculants to flocculate in the pipeline as much as possible. A steel pipe for delivering sludge in an existing common pipeline mixer is a circular pipe opened with a through hole in its sidewall. A mixer is vertically inserted into the through hole to perform mixing. Because a mixing shaft of the mixer is perpendicular to a central shaft of the circular pipe, it is difficult for a mixing blade of the mixer to nestle up to the pipe inside wall of a circular arc shape, inevitably spawning blind spots. Insufficient or non-uniform mixing in the blind spots incurs an undesired and unstable flocculation effect.

SUMMARY OF THE INVENTION

The first technical problem to be solved by the present invention is to provide a highly efficient pipe-type flocculation mixer, in which a circular mixing pipe is independently provided and a mixing blade is exactly accommodated in the mixing pipe. Thus, the present invention eliminates blind spots, and realizes sufficient mixing.

The highly efficient pipe-type flocculation mixer of the present invention is implemented as follows. The highly efficient pipe-type flocculation mixer includes: a feeding pipe, a mixing pipe, a discharging pipe and a mixer, where the feeding pipe, the mixing pipe and the discharging pipe are disposed in parallel and sequentially communicated; the mixing pipe is a circular pipe and has two blind ends; the mixer includes a driving motor, a mixing blade and a central shaft; one end of the central shaft is coupled to the driving motor, and the other end of the central shaft is coupled to the mixing blade; and an axial length of the mixing blade enables the mixing blade to be exactly accommodated in the mixing pipe.

Further, a notch is opened in a sidewall of the feeding pipe and a sidewall of the discharging pipe separately, two notches are respectively opened in opposite sidewalls of the mixing pipe, and the two notches of the mixing pipe are directly connected to the notch of the feeding pipe and the notch of the discharging pipe respectively, to realize communication.

Further, the notches are all axially elongated, and their lengths are equal to the length of the mixing pipe.

Further, one end of the feeding pipe opposite to a feed port is a blind end, and one end of the discharging pipe opposite to a discharge port is a blind end, where the blind end of the feeding pipe, the blind end of the discharging pipe, and one blind end of the mixing pipe are flush with each other.

Further, the driving motor is directly connected outside one blind end of the mixing pipe.

Further, an agent feeding chamber is further disposed at one end of the mixing pipe; the driving motor is connected at an outer end of the agent feeding chamber; the central shaft of the mixer is a hollow shaft; an upper section of the central shaft is disposed in the agent feeding chamber, and a lower section thereof is disposed in the mixing pipe and coupled to the mixing blade; an agent feeding hole communicated with the agent feeding chamber is provided on a sidewall of the agent feeding chamber; and a centric agent inlet is provided on the upper section of the central shaft, and an agent spout is provided on the lower section thereof.

Further, the agent spout is axially elongated.

Further, a shaft hole for the central shaft to run through is provided on the upper end of the agent feeding chamber, and a mechanical sealing part is provided at the shaft hole.

Further, an agent feeding hole is directly opened in a sidewall of the feeding pipe.

The second technical problem to be solved by the present invention is to provide a feeding-mixing device, where an agent can be introduced into a hollow central shaft via an agent feeding chamber, and be sprayed out from the central shaft into a mixing chamber. This agent feeding manner enables sufficient mixing.

The feeding-mixing device of the present invention is implemented as follows. The feeding-mixing device includes a driving motor, a mixing blade, a central shaft, and an agent feeding chamber. The driving motor is fixedly coupled to the agent feeding chamber; one end of the central shaft is coupled to the driving motor, and the other end thereof passes through the agent feeding chamber and then is coupled to the mixing blade; the central shaft is a hollow shaft; an agent feeding hole communicated with the agent feeding chamber is provided on a sidewall of the agent feeding chamber; one section of the central shaft disposed in the agent feeding chamber is provided with a centric agent inlet, and the other section coupled to the mixing blade is provided with an agent spout.

The present invention has the following advantages:

1. A circular mixing pipe is independently provided, and a mixing range of the mixing blade and inner space of the mixing pipe are limited. In this way, the mixing range of the mixing blade basically matches the space defined by the inside surface of the mixing pipe, such that the mixing operation is performed in a relatively closed and narrow cavity. Thus, no blind spot occurs, and more stable and uniform mixing is realized.

2. The mixing pipe, the feeding pipe, and the discharging pipe are disposed in parallel and sequentially communicated directly through notches. In this way, materials and flocculants are mixed at high speed and blended, and then blocked and buffered by the sidewall of the discharging pipe, thus achieving a more stable flocculation effect.

3. Because the two ends of the mixing pipe are both blind ends, the driving motor can be directly mounted on one end of the mixing pipe. Thus, the central shaft is long, which enhances stability during high-speed rotation, and lowers the requirement for the sealing degree. Damage to the mixing blade is reduced.

4. There are two options for an agent feeding manner. In one manner, the flocculants are directly fed via the feeding pipe. In the other manner, an agent feeding chamber is provided to introduce the flocculants into the hollow central shaft, and then the flocculants are sprayed out from the central shaft to realize agent feeding, thus enabling more uniform mixing.

BRIEF DESCRIPTION OF THE DRAWINGS

The present invention is further described below with reference to the accompanying drawings and embodiments.

DETAILED DESCRIPTION OF THE PREFERRED EMBODIMENTS

Figure 1:
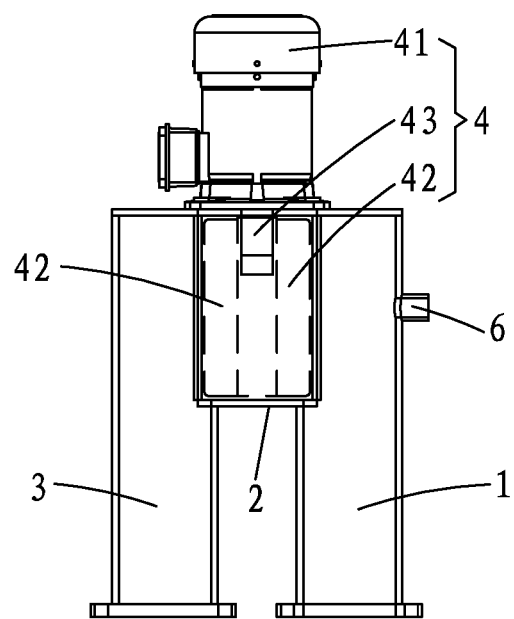
FIG. 1 is a schematic structural diagram of a preferred embodiment of a pipe-type flocculation mixer of the present invention.

As shown in FIG. 1 to FIG. 4, a highly efficient pipe-type flocculation mixer of the present invention includes: a feeding pipe 1, a mixing pipe 2, a discharging pipe 3 and a mixer 4. The feeding pipe 1, the mixing pipe 2 and the discharging pipe 3 are disposed in parallel and sequentially communicated.

The mixing pipe 2 is a circular pipe and has two blind ends. As such, the mixing operation can be performed in a relatively closed and narrow cavity, and thus no blind spots occur during mixing. One end of the feeding pipe 1 opposite to a feed port is a blind end, and one end of the discharging pipe 2 opposite to a discharge port is a blind end. The blind end of the feeding pipe 1, the blind end of the discharging pipe 3, and one blind end of the mixing pipe 2 are flush with each other. For example, they can be closed by the same closure plate 5.

Figure 3:
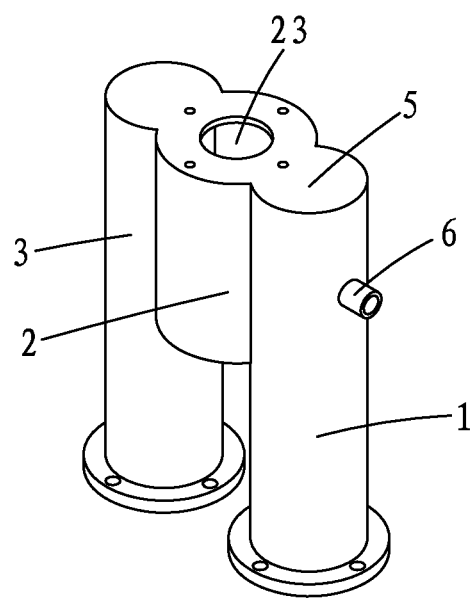
FIG. 3 is a schematic diagram of an overall structure of a feeding pipe, a mixing pipe, and a discharging pipe in the pipe-type flocculation mixer of the present invention.
Figure 4:
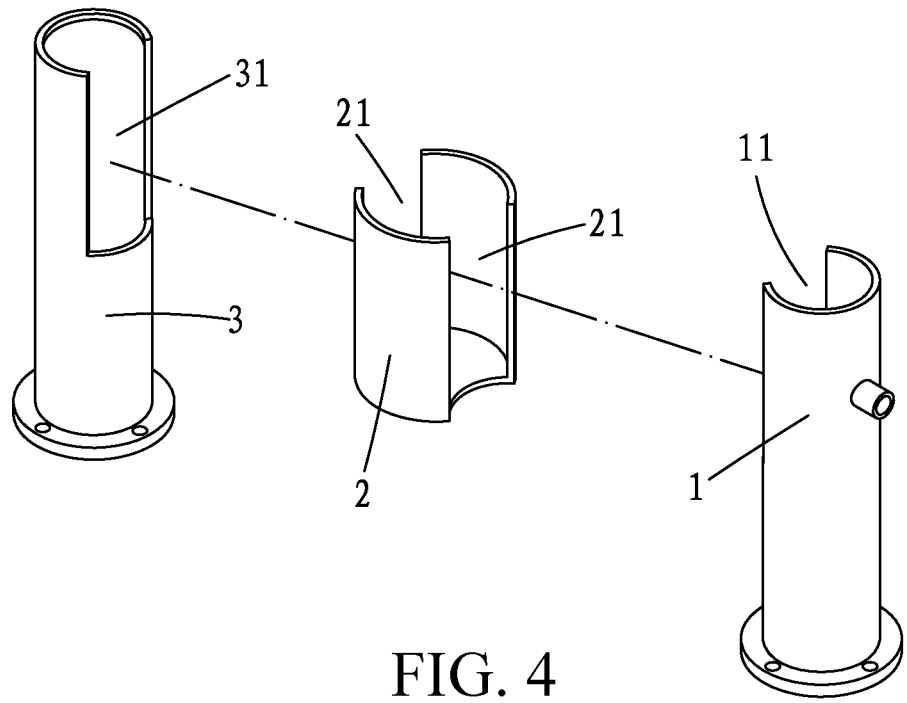
FIG. 4 is a schematic exploded structural diagram of FIG. 3.

As shown in FIG. 3 and FIG. 4, notches 11 and 31 are respectively opened in a sidewall of the feeding pipe 1 and a sidewall of the discharging pipe 3. Two notches 21 are respectively opened in opposite sidewalls of the mixing pipe 2. The two notches 21 of the mixing pipe 2 are directly connected to the notch 11 of the feeding pipe and the notch 31 of the discharging pipe respectively, to realize communication. The direct connection via the notches shortens the flow patch and speeds up the flow. Liquid which exits from the mixing pipe 2 can directly impact on the sidewall of the discharging pipe 3, which achieves a remixing effect, thus further improving a final mixing effect.

The notch 11 of the feeding pipe 1, the notches 21 of the mixing pipe 2 and the notch 31 of the discharging pipe 3 are all axially elongated, and their lengths are equal to the length of the mixing pipe 2. In this way, the notches are relatively lengthened, further speeding up the flow and shortening the flow patch. Thus, mixing efficiency is further improved.

The mixer 4 includes a driving motor 41, a mixing blade 42 and a central shaft 43. One end of the central shaft 43 is coupled to the driving motor 41, and the other end thereof is coupled to the mixing blade 42. An axial length of the mixing blade 42 is slightly less than the length of the mixing pipe 2, and enables the mixing blade 42 to be exactly accommodated in the mixing pipe 2. In this way, during rotation, the mixing blade 42 nestles up to inside surfaces of the two blind ends of the mixing pipe 2, and thus no blind spot occurs during mixing. The driving motor 41 is a positive and negative two-way speed regulating motor, and its rotation speed is controlled by a frequency converter (not shown in the figure). Therefore, the mixing direction and speed can be adjusted according to specific conditions.

The present invention provides two agent feeding manners, which are as follows:

In the first manner, as shown in FIGS. 1, 3, and 4, an agent is fed via the feeding pipe. The feeding pipe is provided with an agent feeding hole 6 through which flocculants are introduced. Thus, the driving motor may be directly disposed at one blind end of the mixing pipe.

Figure 2:
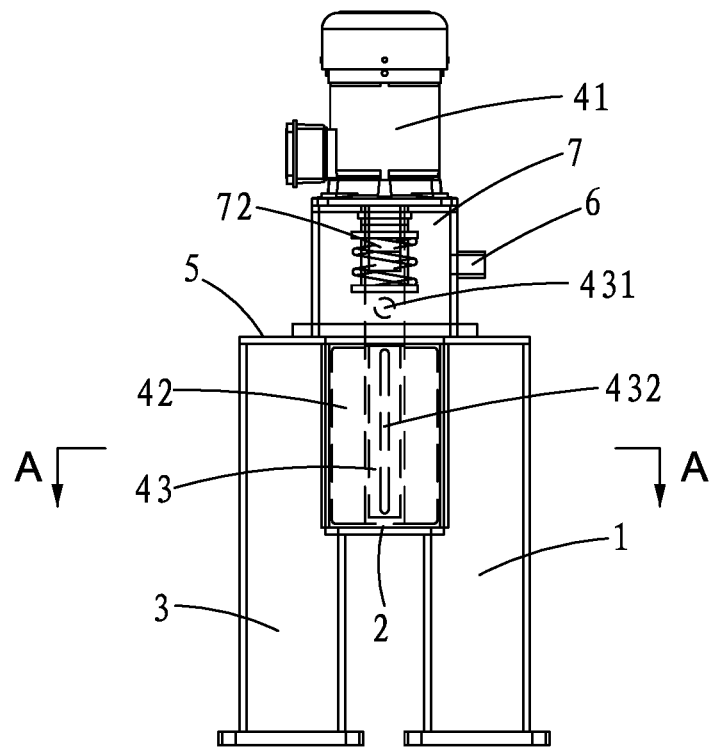
FIG. 2 is a schematic structural diagram of another preferred embodiment of a pipe-type flocculation mixer of the present invention.
Figure 2A:
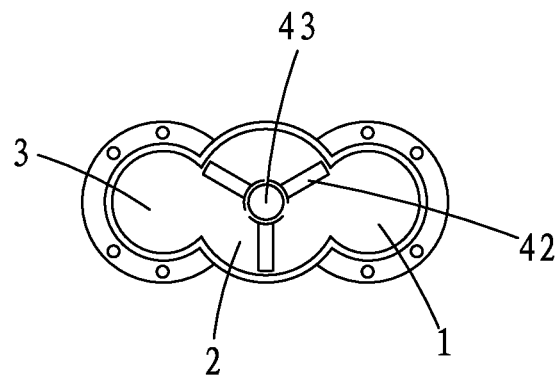
FIG. 2A is a schematic cross-sectional structural diagram along A-A of FIG. 2.

In the second manner, as shown in FIG. 2 and FIG. 2A, an agent feeding chamber 7 is further disposed at one end of the mixing pipe 2. The driving motor 41 is connected at an outer end of the agent feeding chamber 7. The central shaft 43 of the mixer 4 is a hollow shaft. An upper section of the central shaft 43 is disposed in the agent feeding chamber 7, and a lower section thereof is disposed in the mixing pipe 2 and coupled to the mixing blade 42. An agent feeding hole 6 communicated with the agent feeding chamber 7 is provided on a sidewall of the agent feeding chamber 7. A centric agent inlet 431 is provided on the upper section of the central shaft 43, and an agent spout 432 is provided on the lower section thereof. After entering the agent feeding chamber 7 from the agent feeding hole 6, the agent gets into the central shaft 43 via the centric agent inlet 431, and then is sprayed out of the agent spout 432. The agent spout 432 is axially elongated, and has a length close to that of the mixing pipe 2, such that the flocculants are sprayed more evenly.

A shaft hole 23 for the central shaft 43 to run through is provided on the upper end of the agent feeding chamber 7, and a mechanical sealing part 72 is provided at the shaft hole to prevent the flocculants from flowing out of the shaft hole.

Figure 5:
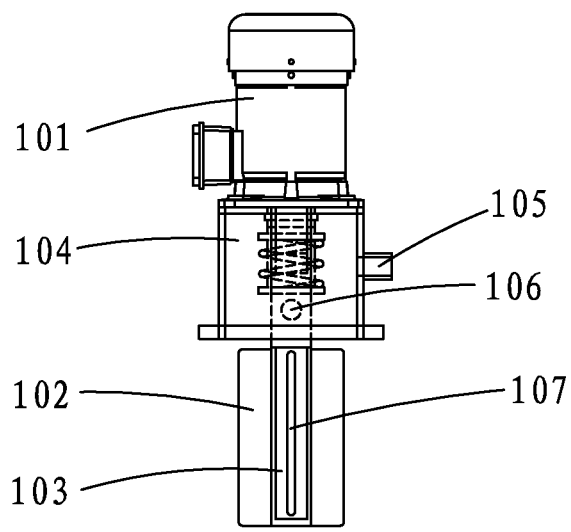
FIG. 5 is a schematic structural diagram of a feeding-mixing device of the present invention.

As shown in FIG. 5, a feeding-mixing device of the present invention includes a driving motor 101, a mixing blade 102, a central shaft 103, and an agent feeding chamber 104. The driving motor 101 is fixedly coupled to the agent feeding chamber 104. One end of the central shaft 103 is coupled to the driving motor 101, and the other end thereof passes through the agent feeding chamber 104 and then is coupled to the mixing blade 102. The central shaft 103 is a hollow shaft. An agent feeding hole 105 communicated with the agent feeding chamber 104 is provided on a sidewall of the agent feeding chamber 104. One section of the central shaft 103 disposed in the agent feeding chamber 104 is provided with a centric agent inlet 106, and the other section coupled to the mixing blade 102 is provided with an agent spout 107.

During use, the mixing blade 102 is inserted into a mixing chamber, and an agent is introduced into the agent feeding chamber 104 from the agent feeding hole 105. Then, the agent enters the hollow central shaft 103 via the centric agent inlet 106, and then is sprayed out from the agent spout 107 into the mixing chamber. Spraying and mixing are synchronized, thus realizing uniform and sufficient mixing.

Although specific embodiments of the present invention are described above, persons skilled in the art should understand that the described specific embodiments are merely illustrative, rather than limiting the scope of the present invention. Equivalent modifications and variations made by those skilled in the art based on the spirit of the present invention shall all fall within the protection scope of the appended claims of the present invention.

What is claimed is:

1. A highly efficient pipe-type flocculation mixer, comprising: a feeding pipe, a mixing pipe, a discharging pipe and a mixer, wherein the feeding pipe, the mixing pipe and the discharging pipe are disposed in parallel and sequentially communicated; the mixing pipe is a circular pipe and has two blind ends; the mixer comprises a driving motor, a mixing blade and a central shaft; one end of the central shaft is coupled to the driving motor, and the other end of the central shaft is coupled to the mixing blade; and the mixing pipe the mixing blade nestles up to inside surfaces of the two blind ends of the mixing pipe; wherein a notch is opened in a sidewall of the feeding pipe and a sidewall of the discharging pipe separately, two notches are respectively opened in opposite sidewalls of the mixing pipe, and the two notches of the mixing pipe are directly connected to the notch of the feeding pipe and the notch of the discharging pipe respectively, to realize communication; wherein the notches are all axially elongated, and their lengths are equal to the length of the mixing pipe.

2. The highly efficient pipe-type flocculation mixer according to claim 1, wherein one end of the feeding pipe opposite to a feed port is a blind end, and one end of the discharging pipe opposite to a discharge port is a blind end; wherein the blind end of the feeding pipe, the blind end of the discharging pipe, and one blind end of the mixing pipe are flush with each other.

3. The highly efficient pipe-type flocculation mixer according to claim 2, wherein the driving motor is directly connected outside one blind end of the mixing pipe.

4. The highly efficient pipe-type flocculation mixer according to claim 1, wherein an agent feeding chamber is further disposed at one end of the mixing pipe; the driving motor is connected at an outer end of the agent feeding chamber; the central shaft of the mixer is a hollow shaft; an upper section of the central shaft is disposed in the agent feeding chamber, and a lower section thereof is disposed in the mixing pipe and coupled to the mixing blade; an agent feeding hole communicated with the agent feeding chamber is provided on a sidewall of the agent feeding chamber; and a centric agent inlet is provided on the upper section of the central shaft, and an agent spout is provided on the lower section thereof.

5. The highly efficient pipe-type flocculation mixer according to claim 4, wherein the agent spout is axially elongated.

6. The highly efficient pipe-type flocculation mixer according to claim 1, wherein an agent feeding hole is directly opened in a sidewall of the feeding pipe.

* * * * *